United States Patent
Hsu

(10) Patent No.: US 11,095,221 B1
(45) Date of Patent: Aug. 17, 2021

(54) CONSTANT ON-TIME CONTROLLER AND BUCK REGULATOR DEVICE USING THE SAME

(71) Applicant: Elite Semiconductor Memory Technology Inc., Hsinchu (TW)

(72) Inventor: Che-Wei Hsu, Hsinchu (TW)

(73) Assignee: ELITE SEMICONDUCTOR MEMORY TECHNOLOGY INC., Hsinchu (TW)

( * ) Notice: Subject to any disclaimer, the term of this patent is extended or adjusted under 35 U.S.C. 154(b) by 0 days.

(21) Appl. No.: 16/850,029

(22) Filed: Apr. 16, 2020

(51) Int. Cl.
*H02M 3/158* (2006.01)
*H02M 3/156* (2006.01)
*H02M 1/00* (2006.01)

(52) U.S. Cl.
CPC ......... *H02M 3/158* (2013.01); *H02M 3/1563* (2013.01); *H02M 3/1582* (2013.01); *H02M 2001/0025* (2013.01)

(58) Field of Classification Search
CPC .. H02M 3/158; H02M 3/1582; H02M 3/1563; H02M 2001/0025
See application file for complete search history.

(56) References Cited

U.S. PATENT DOCUMENTS

| | | | | |
|---|---|---|---|---|
| 7,714,547 B2 * | 5/2010 | Fogg | ........................ | H03K 4/50 323/224 |
| 9,270,176 B1 * | 2/2016 | Nguyen | ................ | H02M 3/156 |
| 10,418,907 B1 * | 9/2019 | Xi | ............................ | H02M 1/14 |
| 10,587,196 B1 * | 3/2020 | Ho | ........................ | H02M 3/158 |
| 2008/0088292 A1 * | 4/2008 | Stoichita | ............... | H02M 3/156 323/285 |
| 2013/0015830 A1 * | 1/2013 | Zhang | ................. | H02M 3/1588 323/282 |
| 2018/0375429 A1 * | 12/2018 | Trichy | ................ | H02M 3/1563 |
| 2019/0165676 A1 * | 5/2019 | Nogawa | ................ | H02M 3/157 |
| 2019/0199209 A1 * | 6/2019 | Shao | ...................... | H02M 3/158 |
| 2020/0127569 A1 | 4/2020 | Priego | | |

FOREIGN PATENT DOCUMENTS

| | | |
|---|---|---|
| TW | 201214935 A1 | 4/2012 |
| TW | 201236338 A1 | 9/2012 |
| TW | 201801434 A | 1/2018 |

* cited by examiner

*Primary Examiner* — Jue Zhang
(74) *Attorney, Agent, or Firm* — Winston Hsu

(57) ABSTRACT

A constant on-time controller (COT) includes: a voltage dividing circuit to generate a feedback voltage according to an output voltage of a buck regulator; a current ripple extracting circuit to sense a current from an inductor of a buck regulator, and generate an extracted ripple current having no DC component according to a sensed current; a one-shot on-timer to output a constant-on time control signal according to a regulator input voltage of the buck regulator and the output voltage; a comparing circuit to output a comparison result according to a reference voltage signal, the feedback voltage and the extracted ripple current; and a logic circuit to generate a control signal to the buck regulator according to the comparison result and the constant-on time control signal. The current ripple extracting circuit detects the DC component in the present cycle, and compares the detected DC component with the next cycle.

18 Claims, 7 Drawing Sheets

CONSTANT ON-TIME CONTROLLER AND BUCK REGULATOR DEVICE USING THE SAME

BACKGROUND OF THE INVENTION

1. Field of the Invention

The present disclosure relates to a buck regulator, and more particularly, to a constant on-time (COT) controller used in a buck regulator device.

2. Description of the Prior Art

Constant on-time controllers are widely used in a buck regulator device, and can use a regulator output voltage ripple to initiate an on-time whenever a regulator output voltage drops below a reference voltage. Please refer to FIG. 1A, which shows the waveform of current and the corresponding operation of a switch. As shown in FIG. 1A, the on-time (i.e. the periods where the corresponding logic level is high) may be terminated by circuitry in response to some conditions (such as referencing the level of a regulator input voltage). During the on-time pulse, energy is supplied directly from the regulator input voltage to the regulator output voltage via an electronic switching device. Likewise, when the on-time pulse is terminated, energy stored in the inductor is supplied to the regulator output voltage.

The buck regulator device with a constant on-time controller usually includes circuits that adjust the on-time pulse duration by referencing the regulator input voltage and the regulator output voltage, thus resulting in a nearly constant frequency as the duty cycle changes. The regulator output voltage ripple is determined to having a large extent by a ripple current in the inductor flowing through an output capacitor's equivalent series resistance (ESR). In applications that the multilayer ceramic capacitor (MLCC) has the small ESR, such that the voltage ripple from the inductor is also small. This creates two major problems for the constant on-time controller, that is, the instability and susceptibility to noise.

In general, COT controller devices benefit from the characteristics of self-oscillating, simple structure, high efficiency at light load, and fast load transient response. However, COT controller devices also suffer from disadvantages such as the jitter behavior due to low noise immunity, severe EMI issues, demand for an ESR, and poor DC regulation. Therefore, there is a need for a novel design to solve the aforementioned issue.

SUMMARY OF THE INVENTION

One objective of the present disclosure is to provide a constant on-time controller used in a buck regulator device, so as to extend the noise margin of the constant on-time controller while the characteristic of fast load transient response can be reserved.

Another objective of the present disclosure is to provide a constant on-time controller used in a buck regulator device to minimize the susceptibility of the constant on-time controller to the noise, such that a non-ideal jitter is significantly reduced.

Another objective of the present disclosure is to provide a buck regulator device comprising a buck regulator and a constant on-time controller electrically connected to the buck regulator, so as to solve the problems of instability and susceptibility to the noise.

To achieve at least the above objectives, an embodiment of the present disclosure provides a constant on-time controller. The constant on-time controller comprises a voltage dividing circuit, a current ripple extracting circuit, a one-shot on-timer, a comparing circuit and a logic circuit. The voltage dividing circuit is arranged to generate a feedback voltage according to an output voltage of a buck regulator. The current ripple extracting circuit is arranged to sense a current from an inductor of a buck regulator, and generate an extracted ripple current having no DC component according to a sensed current. The one-shot on-timer is arranged to output a constant-on time control signal according to a regulator input voltage of the buck regulator and the output voltage. The comparing circuit is electrically connected to the voltage dividing circuit and the current ripple extracting circuit, the comparing circuit arranged to output a comparison result according to a reference voltage signal, the feedback voltage and the extracted ripple current. The logic circuit is electrically connected to the one-shot on-timer and the comparing circuit, the logic circuit arranged to generate a control signal to the buck regulator according to the comparison result and the constant-on time control signal. The on-time of the buck regulator is determined according to the constant-on time control signal, and an off-time of the buck regulator is determined according to the comparison result; and the current ripple extracting circuit detects a direct current (DC) component of a sensed waveform in the present cycle at the beginning of the off-time of the buck regulator to generate a detected DC component of the present cycle, and compares the detected DC component of the present cycle with the waveform sensed in the cycle following the present cycle to generate the extracted ripple current.

In addition, another embodiment of the present disclosure provides a buck regulator device that comprises a constant on-time controller. An embodiment of the present disclosure provides a constant on-time controller. The constant on-time controller comprises a voltage dividing circuit, a current ripple extracting circuit, a one-shot on-timer, a comparing circuit and a logic circuit. The voltage dividing circuit is arranged to generate a feedback voltage according to an output voltage of a buck regulator. The current ripple extracting circuit is arranged to sense a current from an inductor of a buck regulator, and generate an extracted ripple current having no DC component according to a sensed current. The one-shot on-timer is arranged to output a constant-on time control signal according to a regulator input voltage of the buck regulator and the output voltage. The comparing circuit is electrically connected to the voltage dividing circuit and the current ripple extracting circuit, the comparing circuit arranged to output a comparison result according to a reference voltage signal, the feedback voltage and the extracted ripple current. The logic circuit is electrically connected to the one-shot on-timer and the comparing circuit, the logic circuit arranged to generate a control signal to the buck regulator according to the comparison result and the constant-on time control signal. The on-time of the buck regulator is determined according to the constant-on time control signal, and an off-time of the buck regulator is determined according to the comparison result; and the current ripple extracting circuit detects a DC component of a sensed waveform in the present cycle at the beginning of the off-time of the buck regulator to generate a detected DC component of the present cycle, and compares the detected DC component of the present cycle with the waveform sensed in the cycle following the present cycle to generate the extracted ripple current.

In one embodiment of the present disclosure, the logic circuit is a flip flop, such as an RS flip flop. A set end of the RS flip flop is electrically connected to comparator and the one-shot on-timer to receive the comparison result signal and an inversion of the constant-on time control signal, and a reset end of the RS flip is electrically connected to the one-shot on-timer to receive the constant-on time control signal.

In one embodiment of the present disclosure, the one-shot on-timer comprises a capacitor, a current source and a voltage comparator. The current source electrically connected to a ground via the capacitor generates a current proportional to the regulator input voltage, so as to form a first voltage across the capacitor. The voltage comparator electrically connected to a connection end of the capacitor and the current source compares the regulator output voltage and the first voltage to output the constant-on time control signal.

In one embodiment of the present disclosure, the constant on-time controller further comprises a ramp generator. The ramp generator electrically connected to the modulation circuit generates a ramp voltage signal. The modulation circuit outputs the modulation signal according to the feedback voltage, the reference voltage signal, the ramp voltage signal and the extracted ripple current.

In one embodiment of the present disclosure, the current ripple extractor comprises a current sensing amplifier, a sample/hold circuit and a subtractor. The current sensing amplifier senses the current in the energy storage inductor of the buck regulator flowing through the output capacitor's ESR to obtain the sensed current. The sample/hold circuit electrically connected to the current sensing amplifier samples and holds up the DC component of the sensed current. The subtractor electrically connected to the current sensing amplifier and the sample/hold circuit subtracts a hold-up DC component from the sensed current to generate the extracted ripple current.

In one embodiment of the present disclosure, the modulation circuit comprises an amplifier, a capacitor, an adder and a modulator. The amplifier receives the reference voltage signal and the feedback voltage to generate a regulated reference voltage signal. Two ends of the capacitor are respectively electrically connected to the amplifier and a ground. The adder electrically connected to the amplifier subtracts the regulated reference voltage signal from a first voltage signal associated with the extracted ripple current to generate a second voltage signal. The modulator electrically connected to the adder generates the modulation signal according to the second voltage signal and the feedback voltage.

In one embodiment of the present disclosure, the modulation circuit comprises an adder and a modulator. The adder electrically connected to the amplifier subtracts the reference voltage signal from a first voltage signal associated with the extracted ripple current to generate a second voltage signal. The modulator electrically connected to the adder generates the modulation signal according to the second voltage signal and the feedback voltage.

In one embodiment of the present disclosure, the voltage divider comprises resistors electrically connected in series.

To sum up, the present disclosure provides a constant on-time controller used in the buck regulator device with the enhanced noise margin and improved load transient response. Moreover, the unwanted jitter can be also eliminated or mitigated in some embodiments, and thus the provided constant on-time controller can further have the improved stability and the immunity to.

These and other objectives of the present disclosure will no doubt become obvious to those of ordinary skill in the art after reading the following detailed description of the preferred embodiment that is illustrated in the various figures and drawings.

DETAILED DESCRIPTION

To make it easier for one skilled in the art to understand the objects, characteristics and effects of the present disclosure, embodiments together with the attached drawings for the detailed description of the present disclosure are provided.

An embodiment of the present disclosure provides a buck regulator device comprising a constant on-time (COT) controller (e.g. the COT controller 11 in FIG. 1B) and a buck regulator (e.g. the buck regulator 12 in FIG. 1B) electrically connected to the buck regulator, wherein a current ripple extracting circuit of the constant on-time controller is used to sense a current from an inductor flowing through an output capacitor's equivalent series resistance (ESR) (i.e. to sense a low side current of the buck regulator), to remove a direct current (DC) component of a sensed current to generate an extracted ripple current, and to generate a ripple voltage signal to a comparator of the constant on-time controller according to the extracted ripple current, so as to extend the noise margin of the constant on-time controller while ideal load transient response rate is meanwhile reserved.

Furthermore, in another embodiment of the present disclosure, a ramp generator is used in the constant on-time controller to provide a ramp voltage signal to the comparator of the constant on-time controller, and thus the susceptibility of the constant on-time controller to the noise can be minimized, and a jitter can also be substantially reduced. In short, the provided constant on-time controller of the buck regulator device can solve the problems of the low stability and the susceptibility to the noise.

Figure 1A:
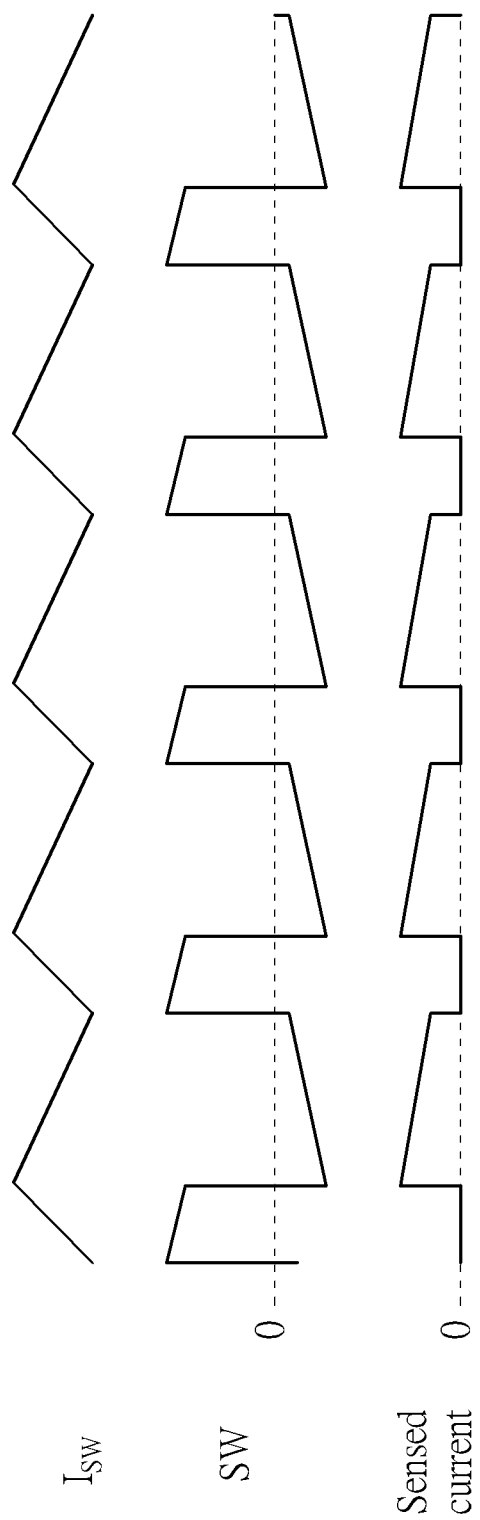
FIG. 1A shows a current curve and the corresponding operation of a switch.
Figure 1B:
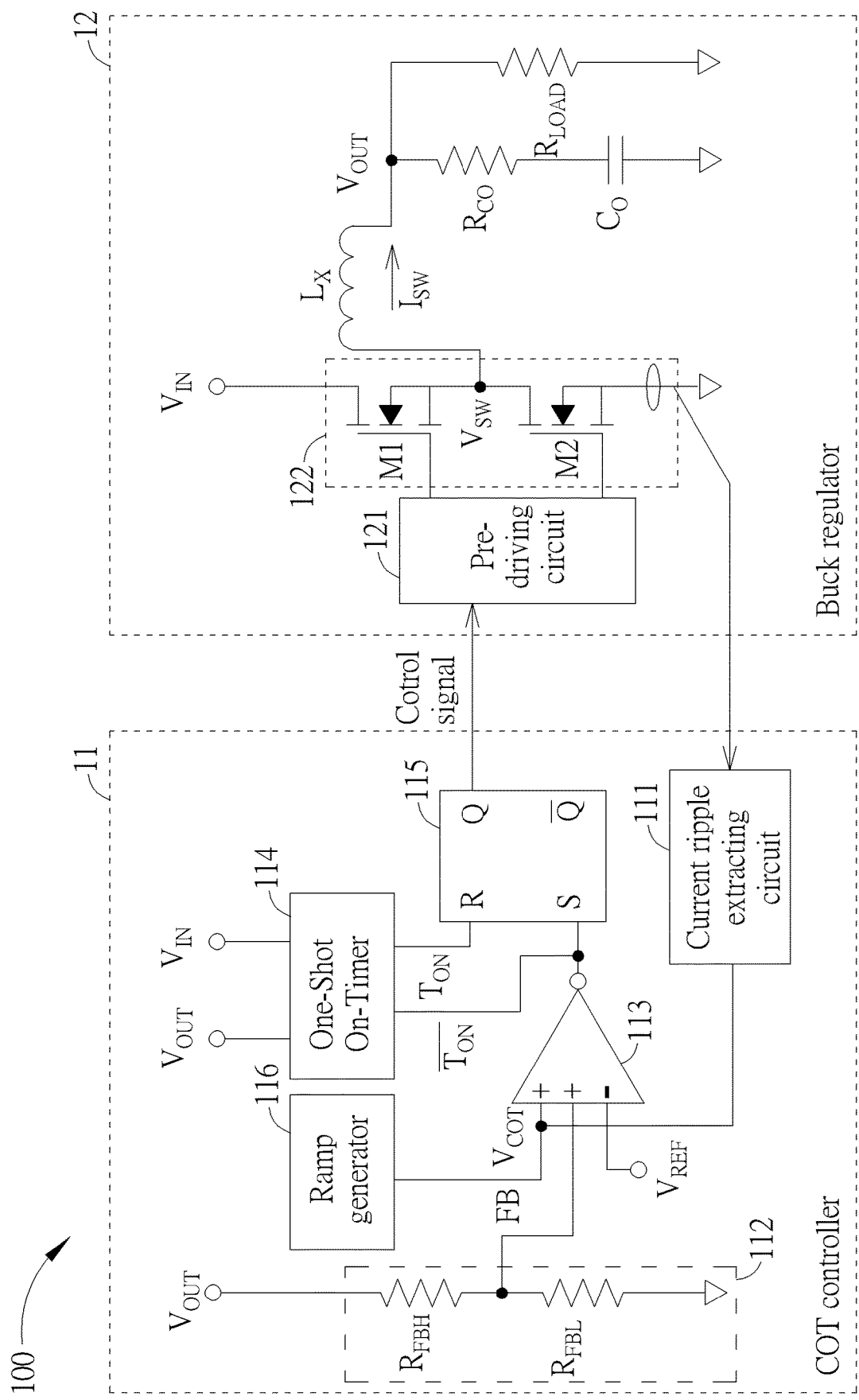
FIG. 1B is a circuit diagram of a buck regulator device according to one embodiment of the present disclosure.

Referring to FIG. 1, FIG. 1B is a circuit diagram of a buck regulator device according to one embodiment of the present disclosure. A buck regulator device 100 comprises a COT controller 11 and a buck regulator 12 electrically connected to the COT controller 11. Please note that the COT controller 11 is not limited to COT usages only. Turning on and off the buck regulator 12 is controlled by the COT controller 11. When the buck regulator 12 is turned on, the COT controller 11 transfers energy of a regulator input voltage $V_{IN}$ to a regulator input voltage $V_{OUT}$ via an electronic switching device 122 that comprises the transistors M1 and M2. For example, the above operation can be achieved by turning on the transistor M1 and turning off the transistor M2. When the transistor M1 is turned off and the transistor M2 is turned on, the energy in stored the inductor $L_X$ is supplied to the regulator output voltage $V_{OUT}$. Please note that the transistors M1 or M2 used in the present disclosure can actually be replaced with any kind of switching elements.

The COT controller 11 receives the regulator output voltage $V_{OUT}$, and senses a current $I_{SW}$ on the inductor $L_X$ which later flows through an output capacitor's ESR (i.e. the combined resistance of the resistor $R_{CO}$ and the output capacitor $C_O$ in series). The current $I_{SW}$ is also the low side current of the buck regulator 12. The COT controller 11 generates a feedback voltage FB according to the regulator output voltage $V_{OUT}$, and generates an extracted ripple current according to a sensed current. The COT controller 11 can determine an off-time (i.e. duration which the buck regulator 12 is turned off) of the buck regulator 12 according to the feedback voltage FB and the extracted ripple current, and determine an on-time (i.e. duration which the buck regulator 12 is turned on) of the buck regulator 12 according to the regulator input voltage $V_{IN}$ and the regulator output voltage $V_{OUT}$.

In related art techniques, since the extracted ripple current has the DC component of the current $I_{SW}$, the DC component of the current $I_{SW}$ will be amplified in the COT controller 11, such that the noise margin of COT controller 11 is not ideal enough, resulting in that the COT controller 11 cannot precisely control the off-time of the buck regulator 12. In consequences, the DC component brings more voltage drop/ overshoot in load transient, which suggests the load transient response could be worsen. This phenomenon is later illustrated in the descriptions of FIG. 5C. Moreover, the unwanted jitter effect in related art techniques is also a noteworthy issue.

Details of the buck regulator 12 are illustrated as follows. The buck regulator 12 comprises a pre-driving circuit 121 (which can be replaced with a logic circuit), the transistors M1, M2, the inductor $L_X$, the output capacitor $C_O$ and the output resistor $R_{CO}$. An output load $R_{LOAD}$ can be electrically connected to the regulator output voltage $V_{OUT}$. The output capacitor $C_O$ is electrically connected to the output resistor $R_{CO}$ in a serial connection manner, wherein the output resistor $R_{CO}$ is electrically connected to a ground via the output capacitor $C_O$.

The regulator output voltage $V_{OUT}$ is electrically connected to the output resistor $R_{CO}$ and the inductor $L_X$. The electronic switching device comprises at least the transistors M1 and M2 (which are depicted as NMOS transistors in this embodiment, but can be replaced with PMOS transistors in some modifications of the present disclosure). Gates of the transistors M1 and M2 are electrically connected to the pre-driving circuit 121, the drain of the transistor M1 is electrically connected to the regulator input voltage $V_{IN}$, the source of the transistor M1 is electrically connected to the inductor $L_X$ and the drain of the transistor M2, and the source of the transistor M2 is electrically connected to the ground. In other words, the transistors M1 and M2 are electrically connected to the COT controller 11, such that the COT controller 11 is able to sense the current $I_{SW}$.

The pre-driving circuit 121 is used to receive a control signal from the COT controller 11. The pre-driving circuit 121 outputs gate control signals to gates of the transistors M1 and M2 according to the control signal. When the transistor M1 is turned on (meanwhile the transistor M2 is turned off), the entire buck regulator 12 is thereby turned on, such that the energy of the regulator input voltage $V_{IN}$ is transferred to the regulator output voltage $V_{OUT}$ (i. e. the current $I_{SW}$ is increased); and when the transistor M2 is turned on (meanwhile the transistor M1 is turned off), the entire buck regulator 12 is thereby turned off, such that the energy stored in the inductor $L_X$ is supplied to the regulator output voltage $V_{OUT}$ (the current $I_{SW}$ is therefore decreased).

Details of the COT controller 11 are illustrated as follows. The COT controller 11 comprises a current ripple extracting circuit 111, a voltage dividing circuit 112, a comparing circuit 113, a one-shot on-timer 114, an RS flip flop 115 and a ramp generator 116. The current ripple extracting circuit 111 is electrically connected to the drain of the transistor M2, and is further electrically connected to the comparing circuit 113. The voltage dividing circuit 112 is electrically connected to the regulator output voltage $V_{OUT}$ and the comparing circuit 113. The ramp generator 116 is electrically connected to the comparing circuit 113. An input node of the comparing circuit 113 is electrically connected to a reference voltage signal $V_{REF}$, and the output node of the comparing circuit 113 is electrically connected to the RS flip flop 115. The RS flip flop 115 is electrically connected to the pre-driving circuit 121 and the one-shot on-timer 114.

The current ripple extracting circuit 111 senses the current $I_{SW}$ on the inductor $L_X$ flowing through an output capacitor's ESR (i.e. the low side current of the buck regulator 12) to generate the sensed current, and removes the DC component of the sensed current to generate the extracted ripple current (this feature is later described). After that, the current ripple extracting circuit 111 generates a ripple voltage signal according to the extracted ripple current to the comparing circuit 113.

The ramp generator 116 is used to generate a ramp voltage signal to the comparing circuit 113, in which the ramp voltage signal and the ripple voltage signal are combined to form a voltage signal $V_{COT}$. As mentioned above, the ramp voltage signal is used to reduce the jitter resulted from the noise, and can be omitted if the jitter is not severe enough.

The voltage dividing circuit 112 comprises resistors $R_{FBH}$ and $R_{FBL}$, wherein the resistor $R_{FBH}$ is electrically connected to the regulator output voltage $V_{OUT}$, the comparing circuit 113 and the resistor $R_{FBL}$, and the resistor $R_{FBL}$ is electrically connected to the ground. The voltage dividing circuit 112 generates the feedback voltage FB across the resistor $R_{FBL}$ according to the regulator output voltage $V_{OUT}$, and the feedback voltage FB is provided to the comparing circuit 113.

The comparing circuit 113 generates a comparison result according to the adding result of the voltage signal $V_{COT}$, the feedback voltage FB and the reference voltage signal $V_{REF}$, and outputs the adding result to the set terminal of the RS flip flop 115. For example, when the adding result of the voltage signal $V_{COT}$ and the feedback voltage FB is smaller than the reference voltage signal $V_{REF}$, the RS flip flop 115 may output the control signal having a high logic level to the pre-driving circuit 121, so that the gate control signal generated by the pre-driving circuit 121 may turn on the transistor M1 and turn off the transistor M2. That is, the off-time of the buck regulator 12 can be terminated when the adding result of the voltage signal $V_{COT}$ and the feedback voltage FB is smaller than the reference voltage signal $V_{REF}$.

Figure 2A:
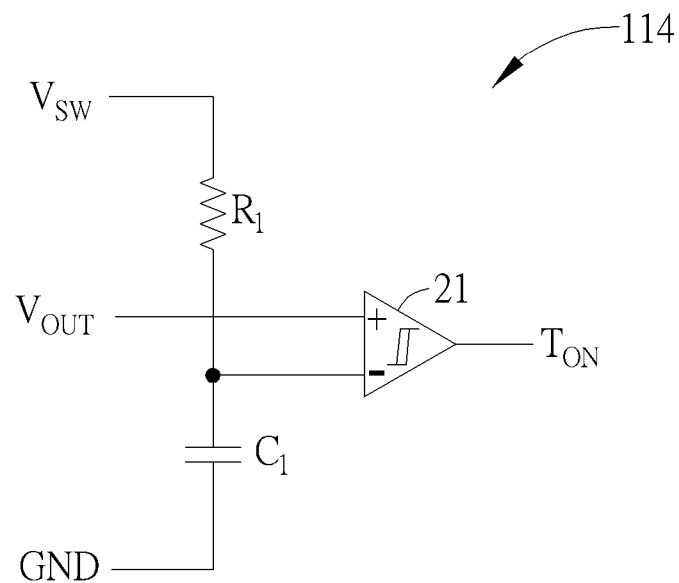
FIG. 2A is a circuit diagram of a one-shot on-timer according to one embodiment of the present disclosure.
Figure 2B:
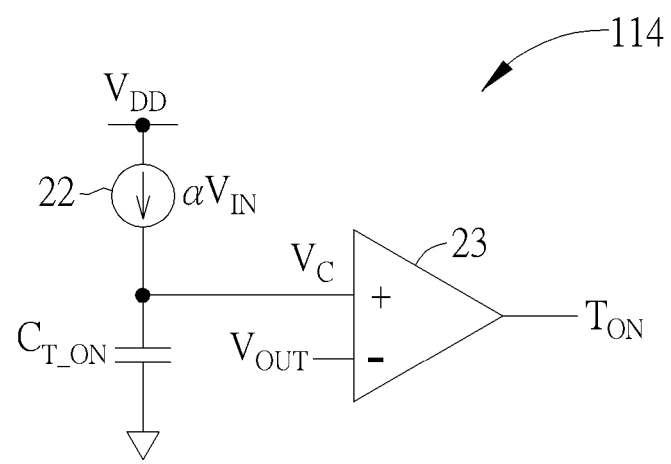
FIG. 2B is a circuit diagram of a one-shot on-timer according to another embodiment of the present disclosure.

The one-shot on-timer 114 receives the regulator input voltage $V_{IN}$ and the regulator output voltage $V_{OUT}$, and generates an on-time control signal $T_{ON}$ (as shown in FIG. 2A and FIG. 2B) and an inversion of the on-time control signal $T_{ON}$ according to the regulator input voltage $V_{IN}$ and the regulator output voltage $V_{OUT}$. The on-time control signal $T_{ON}$ and the inversion signal $T_{ON}$ of the on-time control signal $T_{ON}$ are respectively input to a reset end and a set end of the RS flip flop 115.

The RS flip flop 115 outputs the control signal with a logic high level to pre-driving circuit 121 when the on-time control signal $T_{ON}$ is logic low, and the gate control signal generated by the pre-driving circuit 121 turns on the transistor M2 and turns off the transistor M1. That is, the on-time of the buck regulator is terminated when the on-time control signal $T_{ON}$ is logic low. Accordingly, the COT controller 11 is able to control the on-time and off-time of the buck regulator 12.

Note that the implementation of the COT controller 11 in FIG. 1B is not used to limit the present disclosure. Modifications can be applied for achieving the function of the COT controller 11 by one skilled in the art after reading the present disclosure. For example, in a modification, the RS flip flop 115 can be replaced by another type of flip flop.

Refer to FIG. 1B and FIG. 2A, FIG. 2A is a circuit diagram of a one-shot on-timer according to one embodiment of the present disclosure. FIG. 2A shows an example of the one-shot on-timer 114 of FIG. 1B, but the present disclosure is not limited thereto. The one-shot on-timer 114 comprises a hysteresis comparator 21, a resistor $R_1$ and a capacitor $C_1$. The resistor $R_1$ is electrically connected to a voltage $V_{SW}$ at the drain of the transistor M1 and the source of the transistor M2 (i.e. the voltage at one end of the inductor $L_X$), and is further electrically connected to the ground GND via the capacitor $C_1$. The positive input end of the hysteresis comparator 21 is electrically connected to the regulator output voltage $V_{OUT}$, and the negative input end of the hysteresis comparator 21 is electrically connected to the capacitor $C_1$ and the resistor $R_1$.

The hysteresis comparator 21 compares the voltage across the capacitor $C_1$ and the regulator output voltage $V_{OUT}$ to output a hysteresis comparison result signal as the on-time control signal $T_{ON}$. The voltage $V_{SW}$ varies according to the regulator input voltage $V_{IN}$, the voltage across the capacitor $C_1$ is generated according to the voltage $V_{SW}$, and the on-time control signal $T_{ON}$ is determined according to the voltage $V_{SW}$ and the regulator output voltage $V_{OUT}$. That is, the on-time of the buck regulator 12 is determined according to the regulator input voltage $V_{IN}$ and the regulator output voltage $V_{OUT}$.

Referring to FIG. 1B and FIG. 2B, FIG. 2B is a circuit diagram of a one-shot on-timer according to another embodiment of the present disclosure. Note that FIG. 2B shows another embodiment of the one-shot on-timer 114 of FIG. 1B, and the present disclosure is not limited thereto. The one-shot on-timer 114 comprises a current source 22, a voltage comparator 23 and a capacitor $C_{T\_ON}$. The current source 22 is electrically connected to a supply voltage VDD, and is electrically connected to the ground via the capacitor $C_{T\_ON}$. The positive input end of the voltage comparator 23 is electrically connected to the current source 22 and the capacitor $C_{T\_ON}$, and the negative input end of the voltage comparator 23 is electrically connected to the regulator output voltage $V_{OUT}$.

The current source 22 generates a current flowing through the capacitor $C_{T\_ON}$ according to the regulator input voltage $V_{IN}$, wherein the current is proportional to the regulator input voltage $V_{IN}$. The current flowing through the capacitor $C_{T\_ON}$ forms a voltage $V_C$ across the capacitor $C_{T\_ON}$, and the voltage comparator 23 compares the voltage $V_C$ with the regulator output voltage $V_{OUT}$ to generate the comparison result signal as the on-time control signal $T_{ON}$. Accordingly, the on-time of the buck regulator 12 is determined according to the regulator input voltage $V_{IN}$ and the regulator output voltage $V_{OUT}$.

Figure 3:
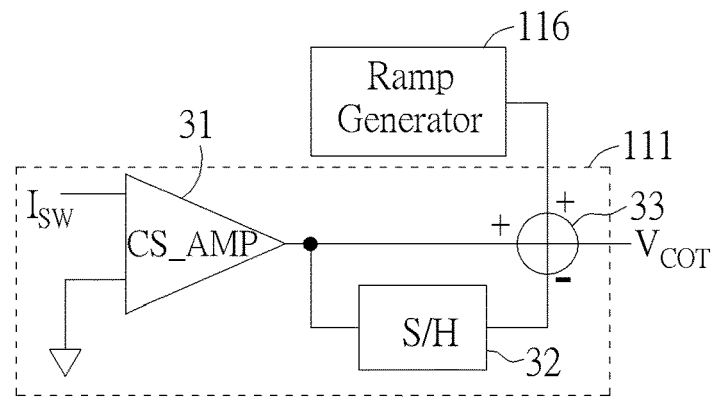
FIG. 3 is a circuit diagram of a current ripple extracting circuit according to one embodiment of the present disclosure.

Next, please jointly refer to FIG. 1B and FIG. 3 which is a circuit diagram of a current ripple extracting circuit according to one embodiment of the present disclosure. FIG. 3 shows an example of the current ripple extracting circuit 111 of FIG. 1B, but the present disclosure is not limited thereto. The current ripple extracting circuit 111 comprises a current sensing amplifier 31 (marked as CS_AMP), a sample/hold circuit 32 (marked as S/H) and a subtractor 33. One input end of the current sensing amplifier 31 is electrically connected to the drain of the transistor M1 and the inductor $L_X$ to receive the low side current of the buck regulator 12 (i.e. the current $I_{SW}$), and the other input end of the current sensing amplifier 31 is electrically connected to the ground. The output end of the current sensing amplifier 31 is electrically connected to the subtractor 33 and the sample/hold circuit 32. The subtractor 33 is electrically connected to the sample/hold circuit 32 and the comparator 113.

The current sensing amplifier 31 is used to sense the current $I_{SW}$. The sensed current is generated by the current sensing amplifier 31 and sent to the subtractor 33 and the sample/hold circuit 32 (marked with S/H in FIG. 3). The DC component of the sensed current can be sampled and held by the sample/hold circuit 32. The subtractor 33 can subtract the held DC component (i.e. the DC component of the previously sensed current) from the sensed current to generate the extracted ripple current, and the extracted ripple current is output as the ripple voltage signal. The subtractor 33 can further add the ramp voltage signal from the ramp generator 116 to the ripple voltage signal to form the voltage signal $V_{COT}$ on the input end of the comparing circuit 113.

Figure 4A:
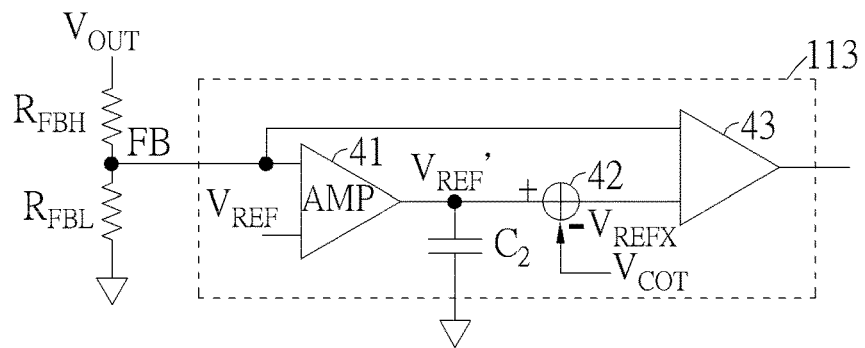
FIG. 4A is a circuit diagram of a comparing circuit according to one embodiment of the present disclosure.

Next, please refer to FIG. 1B and FIG. 4A which is a circuit diagram of a comparing circuit according to one embodiment of the present disclosure. FIG. 4 shows an embodiment of the comparing circuit 113 of FIG. 1B, but the present disclosure is not limited thereto. The comparing circuit 113 comprises an amplifier 41 (marked as AMP), a capacitor $C_2$, an adder 42 and a modulator 43. An output end of the amplifier 41 is electrically connected to one end the capacitor $C_2$. Two input ends of the amplifier 41 are respectively electrically connected to the feedback voltage FB and the reference voltage signal $V_{REF}$. The other end of the capacitor $C_2$ is electrically connected to the ground. Two input ends of the modulator 43 are respectively electrically connected to the feedback voltage FB and an output end of the adder 42, and the output end of the modulator 43 is electrically connected to the RS flip flop 115. The positive input end of the adder 42 is electrically connected to the output end of the amplifier 41, and the negative input end of the adder 42 is electrically connected to the voltage signal $V_{COT}$.

According to the feedback voltage FB and the reference voltage signal $V_{REF}$, the amplifier 41 may generate a regulated reference voltage signal $V_{REF}'$. The adder 42 subtracts the voltage signal $V_{COT}$ from the regulated reference voltage signal $V_{REF}'$ to generate a voltage signal $V_{REFX}$. Next, the modulator 43 generates the comparison result according to the voltage signal $V_{REFX}$ and the feedback voltage FB.

Figure 4B:
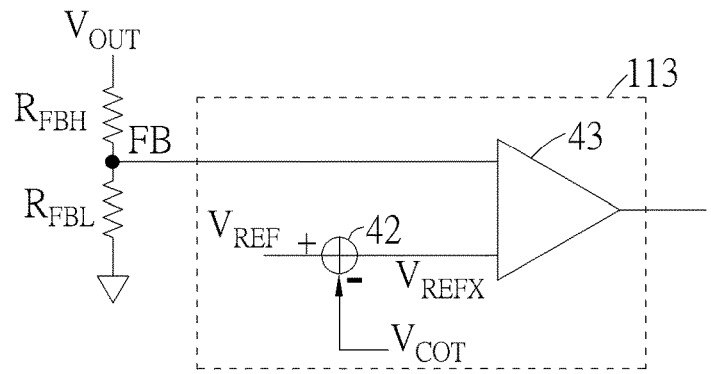
FIG. 4B is a circuit diagram of a comparing circuit according to another embodiment of the present disclosure.

Note that the amplifier 41 is simply used to regulate the reference voltage signal $V_{REF}$, thus the accuracy cannot be affected by the compensation regarding the noise margin. The present disclosure is not limited to the above design. An alternative design is shown in FIG. 4B, which is a circuit diagram of a comparing circuit according to another embodiment of the present disclosure. In the embodiment of FIG. 4B, the amplifier 41 and the capacitor $C_2$ of FIG. 4A are removed. Thus, the adder 42 in FIG. 4B adds the reference voltage signal $V_{REF}$ and the voltage signal $V_{COT}$ to generate the voltage signal $V_{REFX}$, and the modulator 43 generates the comparison result according to the voltage signal $V_{REFX}$ and the feedback voltage FB.

Figure 5A:
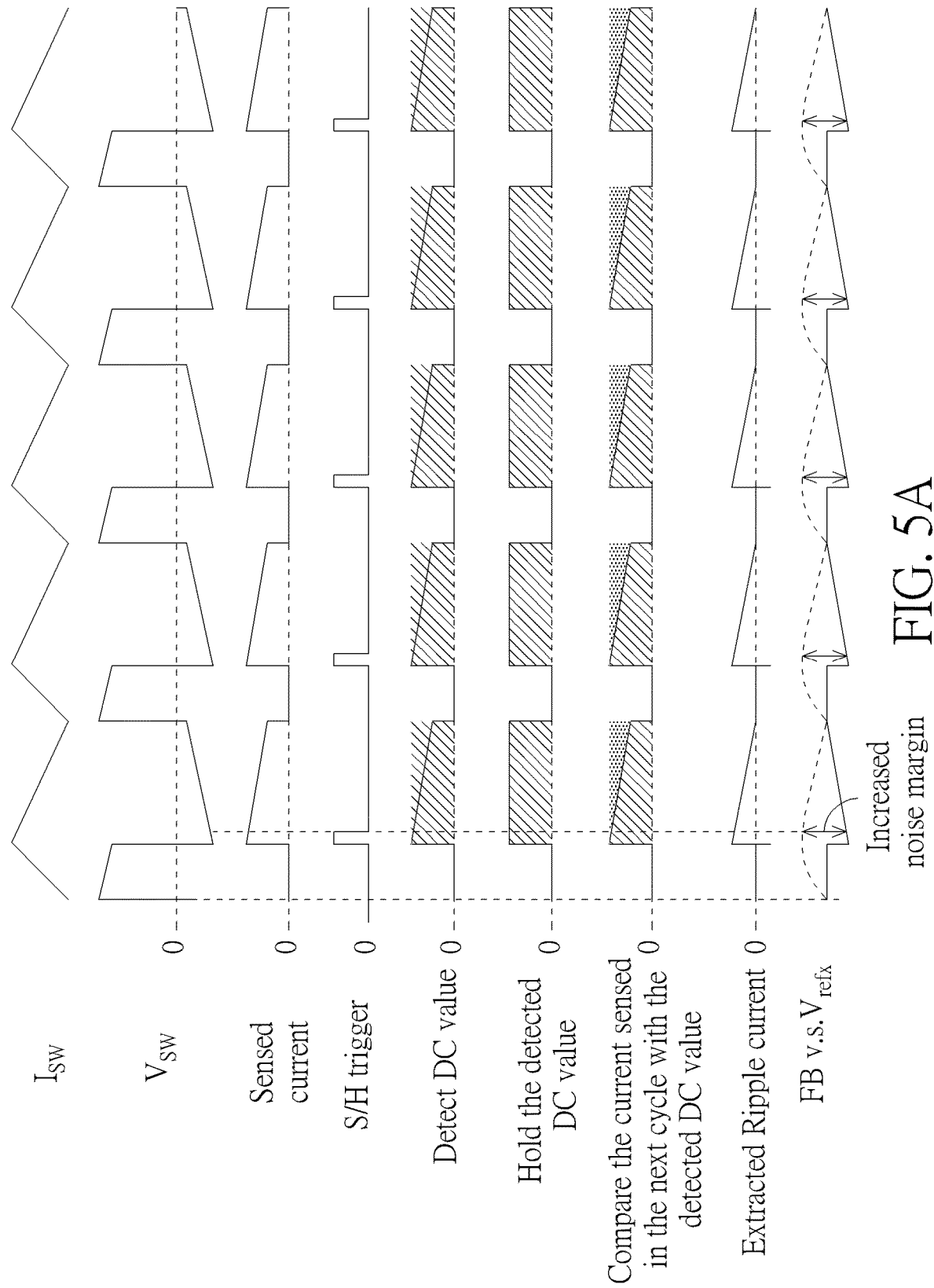
FIG. 5A is a waveform diagram of signals of a buck regulator device according to one embodiment of the present disclosure.

Next, please refer to FIG. 5A which is a waveform diagram of signals of the buck regulator device 12 shown in FIG. 1B according to one embodiment of the present disclosure. As shown in FIG. 5A, initially, the current $I_{SW}$ is increased after the buck regulator 12 is turned on, and is later decreased after the buck regulator 12 is turned off. The voltage $V_{SW}$ is positive during the on-time of the buck regulator 12, and is negative during the off-time of the buck regulator 12. The sensed current is sampled and held at the beginning of the off-time cycle to obtain the maximum DC value of the sensed current. Because the sensed current drops with time during off-time cycle, detecting the maximum DC value at the beginning of the off-time cycle can obtain a more precise and accurate DC value, while detecting any other time point of the off-time cycle may obtain a less stable result.

Figure 5B:
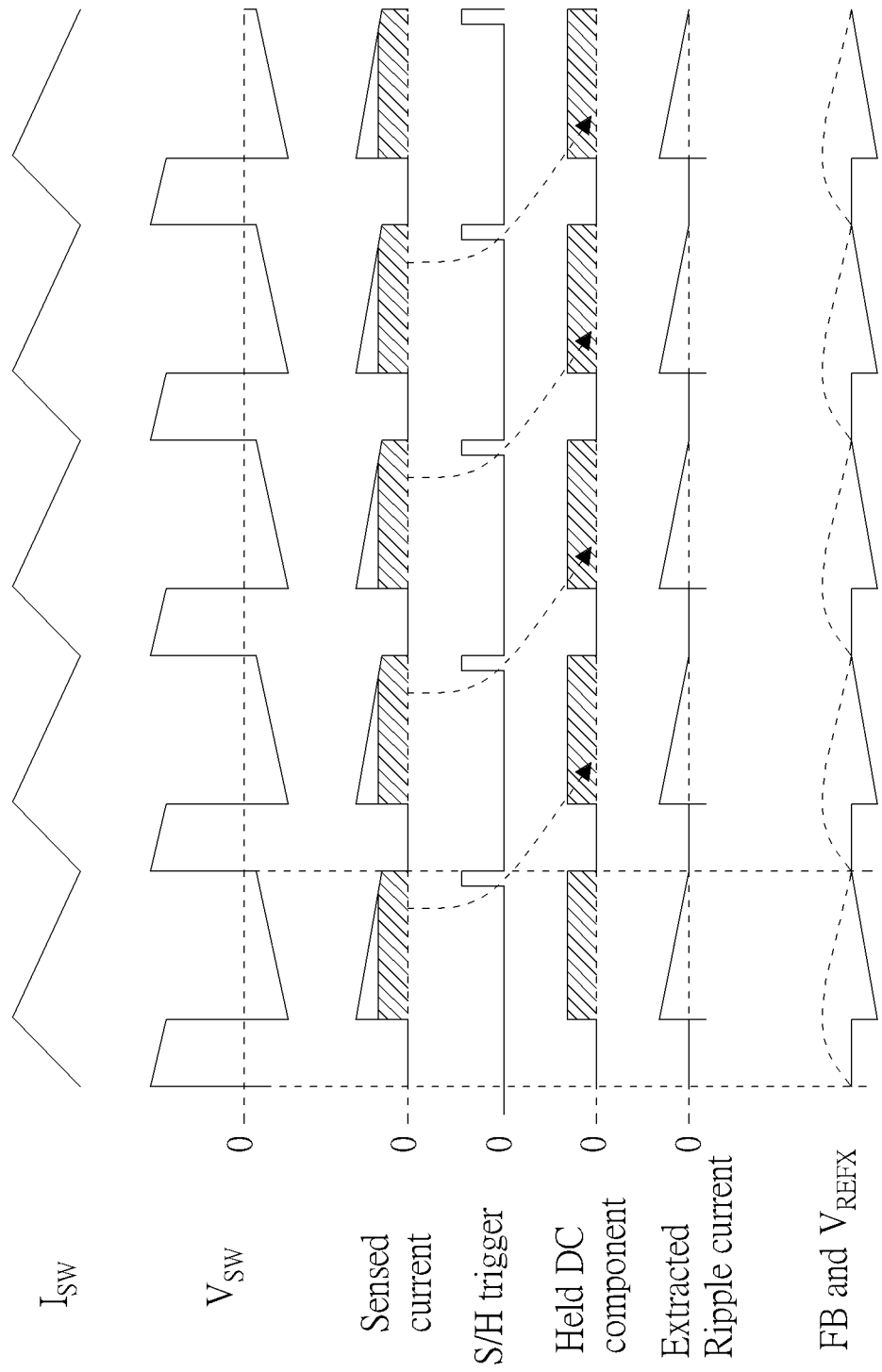
FIG. 5B is a less ideal modification of the solution in FIG. 5A, which illustrates a scenario of detecting the DC value of the sensed current on the ending point of the off-time cycle.
Figure 5C:
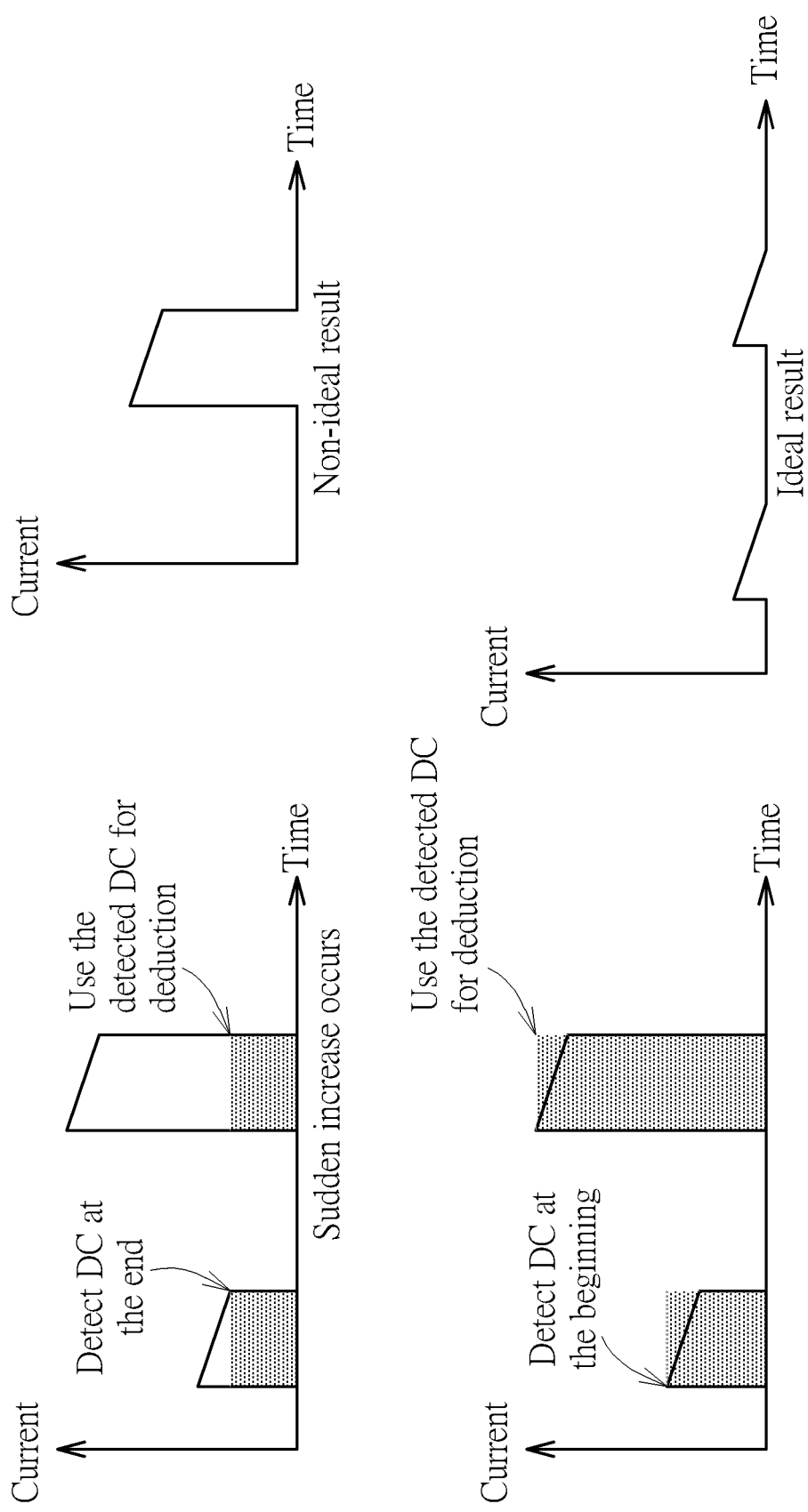
FIG. 5C shows the comparison of the solutions provided in FIG. 5A and FIG. 5B.

For example, please refer to FIG. 5B and FIG. 5C. FIG. 5B is a less ideal modification of the solution in FIG. 5A, which illustrates a scenario of detecting the DC value of the sensed current on the ending point of the off-time cycle. FIG. 5C shows the comparison of the solutions provided in FIG. 5A and FIG. 5B. In the upper-left of FIG. 5C, the DC value is sampled at the ending of the off-time cycle, and is used to deduct the waveform of the next off-time cycle to obtain the deducted result. The deducted result is supposed to contain DC component (e.g. the detected ideal waveform shown in the lower-right of FIG. 5C). However, once the current sensed in the next off-time cycle changes, the detected result will not be correct. For example, the detected result shown in the upper-right of FIG. 5C still contains DC component, resulting in a non-ideal regulator output voltage $V_{OUT}$ for the COT controller 11 in FIG. 1B.

As seen from the above, the operation of detecting the maximum DC value at the beginning of the off-time cycle is advantageous for obtaining a clean extracted ripple current (meaning it contains no DC component or merely contains a trace amount of DC component), which is crucial for an ideal COT controller device. In other words, if the DC component can be completely removed, the variation of the regulator input voltage $V_{OUT}$ (i.e. the $\Delta V_{OUT}$) can be obtained by $\Delta I_L$ (with no DC component). Please refer to the right half of FIG. 1B, $\Delta V_{OUT}$ can be calculated according to the following equation:

$$\Delta V_{OUT} = \Delta I_L \times R_{CO} + \frac{\Delta I_L}{8 \times f_{SW} \times C_O} = V_{ESR} + V_c$$

wherein $R_{CO}$ denotes the resistance of the resistor $R_{CO}$.

As explained above, since the extracted ripple current does not have the DC component of the current $I_{SW}$, the DC component of the current $I_{SW}$ is not amplified in the COT controller 11, such that the noise margin of COT controller 11 can be extended, and the COT controller 11 can precisely control off-time of the buck regulator 12. Since the precision of on/off of the buck regulator 12 is enhanced, the load transient response is thereby improved. Moreover, as far as the jitter due to the noise is concerned, the COT controller 11 further generates a ramp voltage signal, and determines the off-time of the buck regulator 12 not only according to the feedback voltage FB and extracted ripple current, but also according to the ramp voltage signal. Since the ramp voltage signal is considered, the susceptibility to the noise of the COT controller 11 is reduced, and the jitter due to the noise can be reduced. In addition, as can be seen from the bottom row of FIG. 5A showing the feedback voltage FB versus the extracted ripple current, the noise margin of the COT converter is greatly improved.

The sensed current has the DC component, and thus the DC component of the sensed current can be sampled and held according to the sample/hold trigger. The ripple current extractor 111 can subtract the held DC component of the sensed current from the currently sensed current, so as to generate the extracted ripple current. The extracted ripple current and reference voltage signal $V_{REF}$ can be used to generate the comparison voltage signal $V_{REFX}$ as mentioned above. The feedback voltage FB and the comparison voltage signal $V_{REFX}$ can be used to determine the off-time of the buck regulator 12. Specifically, when the feedback voltage FB is less than the comparison voltage signal $V_{REFX}$, the off-time of the buck regulator 12 is terminated.

In conclusion, the present disclosure provides a COT controller used in the buck regulator device, and the provided COT controller can obtain the extracted ripple current by sensing the current in the inductor flowing through the output capacitor's ESR, wherein the extracted ripple current and the feedback voltage can be used to determine the off-time of the buck regulator. Since the extracted ripple current has no DC component, the provided COT controller can have an enhanced load transient response. Moreover, the jitter can be also improved by using a ramp voltage signal to compensate the slope of the extracted ripple current, and thus the provided COT controller has the improved stability and the noise resistance.

While the present disclosure has been described by means of specific embodiments, numerous modifications and variations could be made thereto by those skilled in the art without departing from the scope and spirit of the present disclosure set forth in the claims.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A constant on-time controller (COT), comprising:
a voltage dividing circuit, arranged to generate a feedback voltage according to an output voltage of a buck regulator;
a current ripple extracting circuit, arranged to sense a current from an inductor of a buck regulator, and generate an extracted ripple current having no DC component according to a sensed current;
a one-shot on-timer, arranged to output a constant-on time control signal according to a regulator input voltage of the buck regulator and the output voltage;

a comparing circuit, electrically connected to the voltage dividing circuit and the current ripple extracting circuit, the comparing circuit arranged to output a comparison result according to a reference voltage signal, the feedback voltage and the extracted ripple current; and a logic circuit, electrically connected to the one-shot on-timer and the comparing circuit, the logic circuit arranged to generate a control signal to the buck regulator according to the comparison result and the constant-on time control signal;

wherein an on-time of the buck regulator is determined according to the constant-on time control signal, and an off-time of the buck regulator is determined according to the comparison result; and the current ripple extracting circuit detects a direct current (DC) component of a sensed waveform in the present cycle at the beginning of the off-time of the buck regulator to generate a detected DC component of the present cycle, and compares the detected DC component of the present cycle with the waveform sensed in the cycle following the present cycle to generate the extracted ripple current.

2. The constant on-time controller according to claim 1, wherein the logic circuit is an RS flip flop, a set end of the RS flip flop is electrically connected to a comparator and the one-shot on-timer in order to receive the comparison result signal and an inversion of the constant-on time control signal, and a reset end of the RS flip is electrically connected to the one-shot on-timer to receive the constant-on time control signal.

3. The constant on-time controller according to claim 1, wherein the one-shot on-timer comprises:
a capacitor, electrically connected to ground;
a resistor, electrically connected to the capacitor in series, the resistor arranged to receive a first voltage at the inductor, wherein the first voltage varies according to the regulator input voltage; and
a hysteresis comparator, electrically connected to a connection node of the capacitor and the resistor, the hysteresis comparator arranged to compare a second voltage at the connection node between the capacitor and the resistor with the output voltage to generate a hysteresis comparison result signal as the constant-on time control signal.

4. The constant on-time controller according to claim 1, wherein the one-shot on-timer comprises:
a capacitor;
a current source, electrically connected to a ground via the capacitor, generating a current proportional to the regulator input voltage, so as to form a first voltage across the capacitor; and
a voltage comparator, electrically connected to a connection node of the capacitor and the current source, comparing the output voltage and the first voltage to output the constant-on time control signal.

5. The constant on-time controller according to claim 1, further comprising:
a ramp generator, electrically connected to the comparing circuit, generating a ramp voltage signal;
wherein the comparing circuit outputs the comparison result according to the feedback voltage, the reference voltage signal, the ramp voltage signal and the extracted ripple current.

6. The constant on-time controller according to claim 1, wherein the current ripple extracting circuit comprises:

a current sensing amplifier, arranged to sense the current from the inductor of the buck regulator to obtain the sensed current;

a sample/hold circuit, electrically connected to the current sensing amplifier, the sample/hold circuit arranged to sample current and hold the detected DC component; and a subtractor, electrically connected to the current sensing amplifier and the sample/hold circuit, the subtractor arranged to subtract the detected DC component in the present cycle from the waveform in the cycle following the present cycle to generate the extracted ripple current.

7. The constant on-time controller according to claim 1, wherein the comparing circuit comprises:
an amplifier, arranged to receive the reference voltage signal and the feedback voltage to generate a regulated reference voltage signal;
a capacitor, having two ends respectively electrically connected to the amplifier and ground;
an adder, electrically connected to the amplifier, the adder arranged to subtract the regulated reference voltage signal from a first voltage signal associated with the extracted ripple current to generate a second voltage signal; and
a modulator, electrically connected to the adder, the modulator arranged to generate the comparison result according to the second voltage signal and the feedback voltage.

8. The constant on-time controller according to claim 1, wherein the comparing circuit comprises:
an adder, arranged to subtract the reference voltage signal from a first voltage signal associated with the extracted ripple current to generate a second voltage signal; and
a modulator, electrically connected to the adder, the modulator arranged to generate the comparison result according to the second voltage signal and the feedback voltage.

9. The constant on-time controller according to claim 1, wherein the voltage dividing circuit comprises resistors electrically connected in series.

10. A buck regulator device, comprising:
a constant on-time controller (COT), comprising:
a voltage dividing circuit, arranged to generate a feedback voltage according to an output voltage of a buck regulator;
a current ripple extracting circuit, arranged to sense a current from an inductor of a buck regulator, and generate an extracted ripple current having no DC component according to a sensed current;
a one-shot on-timer, arranged to output a constant-on time control signal according to a regulator input voltage of the buck regulator and the output voltage;
a comparing circuit, electrically connected to the voltage dividing circuit and the current ripple extracting circuit, the comparing circuit arranged to output a comparison result according to a reference voltage signal, the feedback voltage and the extracted ripple current; and
a logic circuit, electrically connected to the one-shot on-timer and the comparing circuit, the logic circuit arranged to generate a control signal to the buck regulator according to the comparison result and the constant-on time control signal;
wherein an on-time of the buck regulator is determined according to the constant-on time control signal, and an off-time of the buck regulator is determined according to the comparison result; and the current ripple extracting circuit detects a direct current (DC) component of a sensed waveform in the present cycle at the beginning of the off-time of the buck regulator to generate a detected DC component of the present cycle, and compares the detected DC component of the present cycle with the waveform sensed in the cycle following the present cycle to generate the extracted ripple current.

11. The buck regulator device according to claim 10, wherein the logic circuit is an RS flip flop, a set end of the RS flip flop is electrically connected to a comparator and the one-shot on-timer in order to receive the comparison result signal and an inversion of the constant-on time control signal, and a reset end of the RS flip is electrically connected to the one-shot on-timer to receive the constant-on time control signal.

12. The buck regulator device according to claim 10, wherein the one-shot on-timer comprises:
    a capacitor, electrically connected to ground;
    a resistor, electrically connected to the capacitor in series, the resistor arranged to receive a first voltage at the inductor, wherein the first voltage varies according to the regulator input voltage; and
    a hysteresis comparator, electrically connected to a connection node of the capacitor and the resistor, the hysteresis comparator arranged to compare a second voltage at the connection node between the capacitor and the resistor with the output voltage to generate a hysteresis comparison result signal as the constant-on time control signal.

13. The buck regulator device according to claim 10, wherein the one-shot on-timer comprises:
    a capacitor;
    a current source, electrically connected to a ground via the capacitor, generating a current proportional to the regulator input voltage, so as to form a first voltage across the capacitor; and
    a voltage comparator, electrically connected to a connection node of the capacitor and the current source, comparing the output voltage and the first voltage to output the constant-on time control signal.

14. The buck regulator device according to claim 10, further comprising:
    a ramp generator, electrically connected to the comparing circuit, generating a ramp voltage signal;
    wherein the comparing circuit outputs the comparison result according to the feedback voltage, the reference voltage signal, the ramp voltage signal and the extracted ripple current.

15. The buck regulator device according to claim 10, wherein the current ripple extracting circuit comprises:
    a current sensing amplifier, arranged to sense the current from the inductor of the buck regulator to obtain the sensed current;
    a sample/hold circuit, electrically connected to the current sensing amplifier, the sample/hold circuit arranged to sample current and hold the detected DC component; and
    a subtractor, electrically connected to the current sensing amplifier and the sample/hold circuit, the subtractor arranged to subtract the detected DC component in the present cycle from the waveform in the cycle following the present cycle to generate the extracted ripple current.

16. The buck regulator device according to claim 10, wherein the comparing circuit comprises:
    an amplifier, arranged to receive the reference voltage signal and the feedback voltage to generate a regulated reference voltage signal;
    a capacitor, having two ends respectively electrically connected to the amplifier and ground;
    an adder, electrically connected to the amplifier, the adder arranged to subtract the regulated reference voltage signal from a first voltage signal associated with the extracted ripple current to generate a second voltage signal; and
    a modulator, electrically connected to the adder, the modulator arranged to generate the comparison result according to the second voltage signal and the feedback voltage.

17. The buck regulator device according to claim 10, wherein the comparing circuit comprises:
    an adder, arranged to subtract the reference voltage signal from a first voltage signal associated with the extracted ripple current to generate a second voltage signal; and
    a modulator, electrically connected to the adder, the modulator arranged to generate the comparison result according to the second voltage signal and the feedback voltage.

18. The buck regulator device according to claim 10, wherein the voltage dividing circuit comprises resistors electrically connected in series.

* * * * *